United States Patent [19]

Gillespie et al.

[11] Patent Number: 5,059,116
[45] Date of Patent: Oct. 22, 1991

[54] APPARATUS AND PROCESS FOR REMOVING VOLATILE COATINGS FROM SCRAP METAL

[75] Inventors: John R. Gillespie; Charles K. Gillespie, both of St. Louis County, Mo.

[73] Assignee: Gillespie & Powers, Inc., St. Louis, Mo.

[21] Appl. No.: 401,795

[22] Filed: Sep. 1, 1989

Related U.S. Application Data

[63] Continuation-in-part of Ser. No. 285,637, Dec. 16, 1988, abandoned.

[51] Int. Cl.⁵ .............................................. F27B 7/02
[52] U.S. Cl. ...................................... 432/72; 432/13; 432/106; 266/901
[58] Field of Search ............... 432/72, 103, 106, 266, 432/2; 75/445; 266/901; 34/85, 35

[56] References Cited

U.S. PATENT DOCUMENTS

| | | | |
|---|---|---|---|
| 2,743,529 | 5/1956 | Hayes | 432/72 |
| 3,437,321 | 4/1969 | Wilkenson | 432/72 |
| 3,627,289 | 12/1971 | Erman | 432/72 |
| 3,947,235 | 3/1976 | Bornert | 432/2 |
| 4,331,086 | 5/1982 | Fitch et al. | 432/72 |
| 4,411,695 | 10/1983 | Twyman | 432/13 |
| 4,548,651 | 10/1985 | Ramsey | 266/901 |
| 4,681,535 | 7/1987 | Kobari et al. | 432/72 |
| 4,789,332 | 12/1988 | Ramsey et al. | 432/72 |

FOREIGN PATENT DOCUMENTS

1578689 11/1980 United Kingdom.

OTHER PUBLICATIONS

Waste Heat Recovery in Aluminum Scrap Recyling, pp. 191-199.

Primary Examiner—Henry C. Yuen
Attorney, Agent, or Firm—Gravely, Lieder & Woodruff

[57] ABSTRACT

Both aluminum scrap covered with a volatile coating and a heated airstream having a low oxygen content pass through a kiln where the airstream causes the coating to volatilize. The temperature of the airstream, where it enters the kiln, is maintained essentially constant, slightly below the melting temperature of the aluminum, and likewise the temperature of the airstream is maintained essentially constant where the airstream leaves the kiln, this being achieved by varying the mass flow of the airstream to compensate for variances in the nature and mass of the aluminum scrap within the kiln. Beyond the kiln the airstream enters an afterburner where it is heated in the presence of sufficient oxygen to effect combustion of the volatile components of the coating. The airstream then passes through a heat exchanger and back to the kiln. The mass flow within the kiln is controlled by diverting some of the airstream upstream from the heat exchanger or by varying the speed of the fan which creates the airstream.

24 Claims, 3 Drawing Sheets

APPARATUS AND PROCESS FOR REMOVING VOLATILE COATINGS FROM SCRAP METAL

RELATED APPLICATION

This application is a continuation-in-part of copending application Ser. No. 07/285,637 of John R. Gillespie and Charles K. Gillespie, filed Dec. 16, 1988, now abandoned, and entitled APPARATUS AND PROCESS FOR REMOVING VOLATILE COATINGS FROM SCRAP METAL.

BACKGROUND OF THE INVENTION

This Application relates in general to processing metals and more particularly to an apparatus and process for removing volatile coatings from scrap metal.

Because the energy required to melt aluminum metal is considerably less than that required to extract aluminum from its ores, much of the aluminum used in manufactured goods derives from aluminum scrap—and one of the principal sources of aluminum scrap is discarded beverage cans. Because the typical aluminum beverage can has an organic coating, usually a lacquer, on its interior and exterior surfaces, aluminum beverage cans tend to produce a considerable amount of dross when introduced into a melting furnace. In this regard, within the furnace the coating volatizes and ignites before the can melts, and the combustion which ensues oxidizes the aluminum, thereby creating the dross which is actually an oxide of aluminum. Processors of aluminum scrap therefore usually subject aluminum beverage cans to a delacquering operation before introducing them into a melting furnace. Also, beverage cans may contain residual moisture, perhaps in the form of the beverage itself, and to ensure the safety of those operating the melting furnace, the moisture should be eliminated before the cans enter the furnace.

The typical delacquering process attempts to subject the coated beverage cans to temperatures high enough to volatilize the coating, but not so high as to melt the aluminum. Some processes even operate at reduced oxygen levels to lessen the chances of ignition, but all current processes are difficult to control. A slight change in the moisture content can reduce the operating temperature to the point that much of the coating remains, or an increase in the mass of the cans processed may cause the system to react such that it produces excessive temperatures which ignite the coating on some of the cans.

The present invention resides in an apparatus and process which circulates heated air of reduced oxygen content past coated aluminum scrap to remove a coating from the aluminum. Even though the nature and mass of the scrap may vary, the rarefied air remains at a substantially uniform temperature somewhat below melting temperature of the aluminum, and hence the aluminum experiences little oxidation. By varying the mass flow of the rarefied air, the system compensates for variances in the content of the scrap and the mass of the scrap.

DESCRIPTION OF THE DRAWINGS

In accompanying drawings which form part of the specification and wherein like numerals and letters refer to like parts wherever they occur.

DETAILED DESCRIPTION

Figure 1:
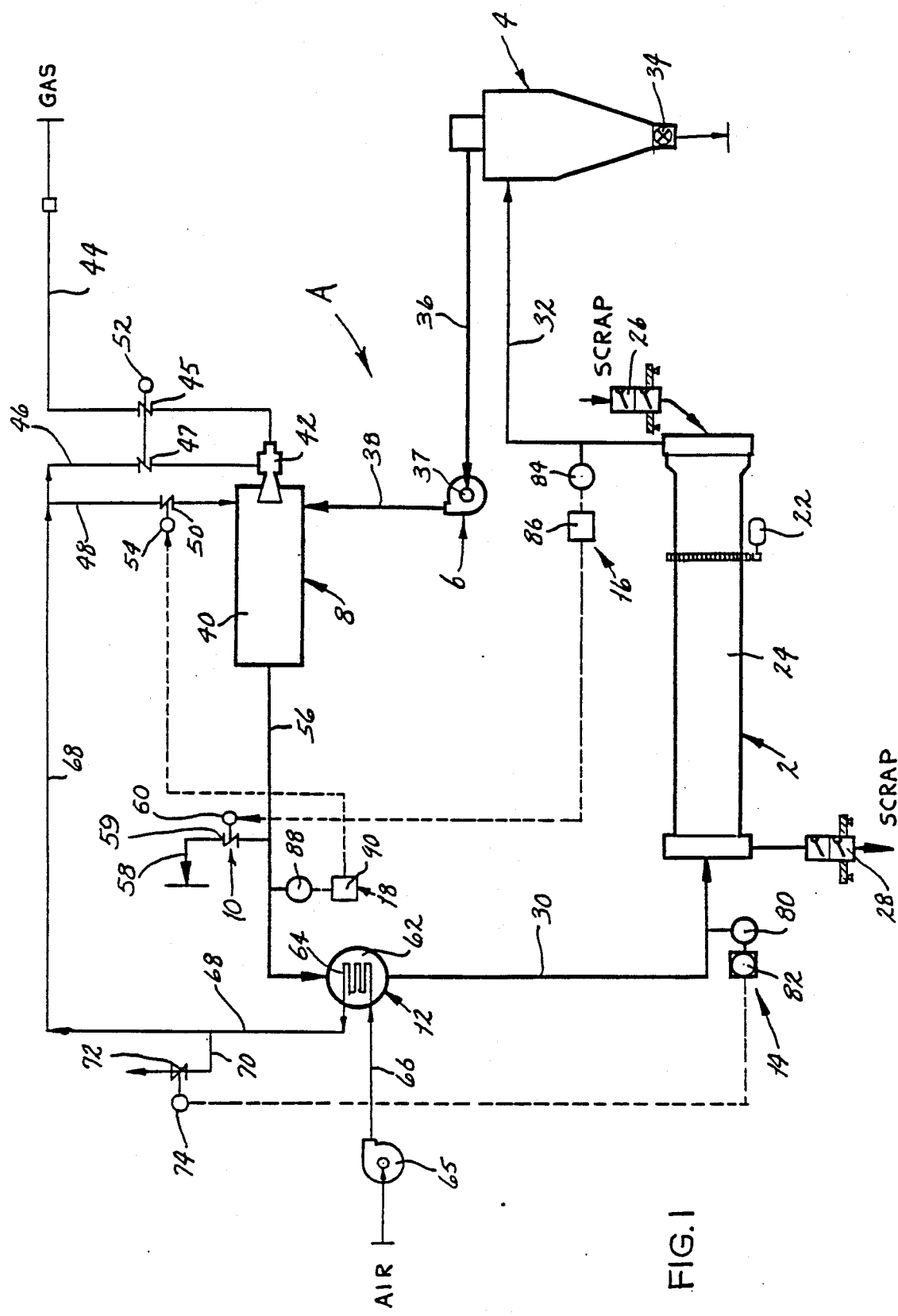
FIG. 1 is a schematic view showing the components of a system for removing volatile coatings from scrap metal.

Referring now the drawings (FIG. 1), a system A for removing coatings from aluminum scrap includes several basic components, namely a kiln 2, a cyclone collector 4, a recirculation fan 6, an incinerator or afterburner 8, a system exhaust 10, and a heat exchanger 12, all arranged within a closed flow path or loop through which an airstream flows. The air of the airstream encounters the scrap in the kiln 2 where it elevates the temperature of the scrap to about 1025° F., which is less than the melting temperature of the aluminum, and at that temperature the organic coatings volatilize and enter the airstream which flows through the kiln 2 in the direction opposite to that at which the scrap travels. The air within the kiln 2 has a reduced oxygen content on the order of 6% to 8%, and at that level the coating does not ignite. The scrap should exist in relatively small fragments, crushed beverage cans being typical. The aluminum of these cans is quite thin, and thus presents a large surface area in comparison to its mass. When the temperature of the coating approaches that at which the aluminum melts, the coating may ignite and oxidize the aluminum, thereby coverting the valuable aluminum into useless dross. Thus, it is important to prevent the coating from igniting in the presence of the aluminum. Typical coatings are lacquers which volatilize below the melting temperature of aluminum.

In addition to the foregoing major components, the system A has three control loops 14, 16, and 18 which sense the condition of the airstream at different locations throughout the system and cooperate to maintain the temperature of the airstream at the entrance to the kiln 2 at about 1125° F. and the oxygen content in the kiln at between 6% and 8%.

Turning now to the kiln 2, it is coupled to an electric motor 22 which rotates it at between 4 and 8 rev/min. The kiln 2 encloses a cylindrical chamber 24 through which the scrap passes, the scrap being introduced into the chamber 24 at one end through an air lock 26 and being removed at the opposite end through another air lock 28. Moreover, the kiln 2 is inclined slightly downwardly, with its scrap discharge end being below its scrap feed end, and it further possesses flights which cause the scrap to tumble as it passes through the kiln 2. The air locks 26 and 28 in effect seal the ends of the chamber 24 and thus isolate the chamber 24 from the surrounding atmosphere. As a consequence, it is possible to control the oxygen content of air passing through the chamber 24, and normally that oxygen content is maintained at between 6% and 8% computed on a volume basis. On the other hand, the temperature of the air entering the chamber 24 is maintained substantially constant within a limited range between 1000° F. and 1200° F. and preferably at 1125° F. This air is derived from a duct 30 which opens into the discharge end of the chamber 24, that is the end at which the scrap passes into the air lock 28. The air within the chamber 24 never experiences a higher temperature, but instead the scrap and kiln 2 extract heat from the air as the air moves through the chamber 24 toward the feed end. Indeed, in flowing through the chamber 24, the air experiences a substantial decrease in temperature. The lower temperature air leaves the chamber 24 through a duct 32 which is connected to the kiln 2 at the feed end of its chamber 24. Indeed, the temperature of the air where it leaves the chamber 24 is likewise maintained substantially constant at between 400° F. and 500° F. and preferably at 450° F., this being achieved by varying the mass of the air flowing through the chamber 24.

Owing to the reduced oxygen content of the air within the chamber 24 of the kiln 2, the coating on the scrap does not ignite within the chamber 24, but for the most part volatilizes and enters the airstream, although a portion may leave as particles which become entrained in the airstream. Indeed, the oxygen content of the air discharged into the chamber 24 from the duct 30 is maintained low enough to prevent ignition of the coating. The time for a fragment of scrap to pass through the kiln 2, that is from when it passes through the air lock 26 and enters chamber 24 to when it passes out of the chamber 24 at the air lock 28, is about 16–20 minutes. The mass of the air passing through the chamber 24 varies, it being dependent on the amount and nature of the scrap, but irrespective of the mass flow, the temperature of the air entering the chamber 24 at the duct 30 remains essentially constant. For example, an increase in the amount of scrap will trigger a greater volume— an increase in mass flow—of air flowing through the chamber 24 per unit of time, but the temperature of the air entering the chamber 24 will remain essentially at 1125° F. The same holds true when the moisture content of the scrap increases.

The duct 32, which is connected to the feed end of the kiln 2, leads to the cyclone collector 4 into which it opens, and thus the air along with the vapor and the particulates are discharged into the cyclone collector 4. Here, by centrifugal force, most of the particulates are removed from the airstream and they collect at the bottom of the collector 4, from which they are withdrawn from time to time through an air lock 34.

Leaving the collector 4, the airstream passes into another duct 36 which leads to the recirculation fan 6 actually to the suction port of the fan 6. The discharge port of the fan 6 is connected to still another duct 38 which leads to the afterburner 8. The fan 6, while having a variable speed electric motor 37, normally operates at a constant speed. However, the speed of the motor 37 is gradually reduced during the interval when the system A is shut down, and this avoids sending an excessive amount of air into the kiln 2 to remove lacquer from substantially reduced mass of scrap.

The afterburner 8 encloses a combustion chamber 40 and includes a burner 42 which is directed into one end of the combustion chamber 40. The burner 42 operates on a combustible gas, such as natural gas, which is fed to it through a fuel line 44 containing a valve 45. The air for supporting this combustion is supplied through a combustion air line 46 containing a valve 47. Actually the air line 46 leads directly to the burner 42, whereas another air line 48 leads to the combustion chamber 40, opening into it slightly downstream from the burner 42. The air line 48 also contains a valve 50. In this regard, the air stream, upon leaving the kiln 2, posseses less than the normal proportion of oxygen, on the order of 6% to 8%, and in order to completely consume the vapors derived from the volitalized coating, additional oxygen must be supplied. That additional oxygen is derived from the air line 48, but some of that oxygen is converted into carbon dioxide and water vapor as a result of the combustion of the volatile components in the afterburner 8. Indeed, the controls within the system A regulate the amount of air supplied through the air line 48 such that the airstream, where it is discharged from the afterburner 8, possesses an oxygen content of about 6% to 8%. The valve 45 in the fuel line 44 and the valve 47 in the air line 46 are operated by a common motor 52. The valve 50 in the air line 48 that leads to the combustion chamber 40 downstream from the burner 42 is controlled by another motor 54.

The heated and rarefied air discharged from the afterburner 8 enters yet another air duct 56 which leads past the system exhaust 10 to the heat exchanger 12. The system exhaust 10 includes in an exhaust duct 58 which intersects the air duct 56 and leads to a bag house or to the atmosphere. It further includes an exhaust damper 59 and a motor 60 which operates the damper 59 to vary the effective cross-sectional size of the duct 58, thus controlling the volume of rarefied air that is allowed to escape from the system A between the afterburner 8 and the heat exchanger 12.

The heat exchanger 12 is interposed between air duct 56 that leads away from the afterburner 8 and the air duct 30 that leads into the kiln 2, and as such the airstream which passes into the heat exchanger 12 from the duct 56 leaves at a lower temperature through the duct 30. The heat exchanger 12 contains two flow paths 62 and 64, the former being for the heated airstream and the latter for cooler air which extracts heat from the airstream, thus lowering the temperature of the airstream. The cooler air is derived from a blower 65 which is connected to the flow path 64 through a supply duct 66. The opposite end of the flow path 64, on the other hand, opens into a discharge duct 68 which is in turn connected to the air lines 46 and 48 that lead to the afterburner 8. Thus, the air for supporting combustion of natural gas at the burner 42 is heated to render the burner 42 more efficient, and the same holds true with respect to the air that is supplied directly to the combustion chamber 40 of the afterburner 8 for incinerating the vapors derived from the coating. Intersecting the discharge duct 68 is a vent duct 70 which contains a damper 72 that is operated by a motor 74. The damper 72, of course, controls the cross-sectional size of the duct 70, which in turn controls the back pressure on the blower 65 and the amount of cooling air that flows through the flow path 64 of the heat exchanger 12.

Thus, within the flow path 62 of the heat exchanger 12, the rarefied airstream experiences a reduction in temperature—indeed a reduction to the temperature best suited for removing the coating from the aluminum scrap in the cylindrical chamber 24 of the kiln 2. The cooling air that passes through the flow path 64, on the other hand, undergoes a rise in temperature, and as such more efficiently supports combustion at the afterburner 8.

The first control loop 14 includes a temperature sensor 80 which is located along the duct 30 close to the location where the duct 30 discharges into the kiln 2. It senses the temperature of the airstream at the entrance to the cylindrical chamber 24 of the kiln 2. The sensor 80 is connected to a controller 82 which generates signals that operate the motor 74 which controls the damper 72 in the vent duct 70. This, in turn, controls the back pressure on the blower 65. The higher the back pressure, the less the volume of air flowing through the path 64 of the heat exchanger; and conversely, the lower the back pressure, the greater the volume of air.

If the temperature of the airstream decreases at the entrance to the kiln 2, the controller 82 generates a signal which causes the motor 74 to close the damper 72, thus reducing the flow of cooling air through the flow path 64 of the heat exchanger 12 and extracting less heat from the airstream as it passes through the flow path 62. This increases the temperature of the airstream. Of course, if the temperature at the entrance to the kiln 2 increases, the opposite occurs. Thus, the first control loop 14 maintains the airstream at an essentially constant temperature where the airstream enters the kiln 2.

The second control loop 16 monitors the temperature of the air discharged from the cylindrical chamber 24 of the kiln 2, and its presence insures that an adequate supply of air passes through the kiln 2. It includes a temperature sensor 84 that is located along the duct 32 which leads from the kiln 2 to the cyclone collector 4 and a controller 86 which generates control signals in response to the temperatures sensed by the sensor 84. The controller 86 is connected to and operates the motor 60 which controls the exhaust damper 59 of the system exhaust 10. Even though the temperature of the airstream remains essentially constant where it enters the cylindrical chamber 24 of the kiln 2, the amount of heat transferred to the scrap in the kiln 2 can vary widely depending on several factors. Among these factors are the mass or quantity of scrap and the moisture content of the scrap within the kiln 2. For example, a greater amount of scrap or moisture will extract more heat from the airstream and thus cause a greater decrease in the temperature of the airstream as it passes through the kiln 2, assuming of course that volume of the airflow—or more accurately the mass flow—remains constant. However, the temperature of the airstream should remain relatively high throughout the chamber of the kiln 2 in order to completely volatilize the coating on the scrap during the limited residence time for the scrap within the chamber 24, that being on the order of 16 to 20 minutes.

To maintain that minimum temperature, and yet avoid excessive heat and the consequent oxidation of the scrap while the scrap is in the kiln 2, the bypass damper 59 of the system exhaust 10 is opened and closed in response to signals from its controller 86. In this regard, the bypass damper 59, during normal operation of the kiln 2, remains partially open so that the airstream in the duct 56 that extends away from the afterburner 8 is directed both to the heat exchanger 12 and out the system exhaust 10; that is to say, it divides at the intersection of the ducts 56 and 58. Should the temperature of the airstream where it is discharged from the kiln 2 drop below a prescribed temperature, the controller 86 will cause the motor 60 to move the exhaust damper 59 so that it further restricts the exhaust duct 58. This diverts more of the airstream to the heat exchanger 12 and thence into the duct 30 which opens into the kiln 2. On the other hand, if the temperature of the airstream as it leaves the kiln 2 exceeds the prescribed temperature, the controller 86 causes the motor 60 to open the exhaust damper 59 still further, so more of the airstream is diverted out of the system exhaust 10 and less into the heat exchanger 12 and the kiln 2 which lies beyond it. In short, the control loop 16 varies the mass flow of the airstream to maintain a prescribed temperature where the airstream leaves the kiln 2.

The third control loop 18 insures that adequate oxygen exists within the combustion chamber 40 of the afterburner 8 to consume all volatiles carried into the combustion chamber 40 by the airstream. It does this be maintaining the oxygen content of the airstream downstream from the afterburner 8 within prescribed limits, such as 6% -8% by volume, this of course being the oxygen content of the airstream where it is discharged from the duct 30 into the kiln 2. The control loop 18 includes an oxygen sensor 88 that is located along the duct 56, and a controller 90 which operates the motor 54 in the air line 48 that leads to the afterburner 8. If the sensor 88 detects that the airstream is deficient, the controller 90 will cause the motor 54 to open the valve 50 still further so that it admits more heated air to the afterburner 8. On the other hand, if the sensor 88 detects an excess of oxygen, the controller 90 will cause the motor 54 to close the valve 50 somewhat and thereby further restrict the air line 48 leading to the afterburner 8.

In the operation of the system A, aluminum beverage cans or other aluminum scrap covered with an organic coatings is introduced into the air lock 26 at the feed end of the kiln 2, whereupon it passes into the cylindrical chamber 24 of the kiln 2. The fragmented scrap, owing to the rotation of the kiln 2, as well as to the inclination of the kiln 2 and flights, tumbles through the chamber 24, and in so doing migrates from the feed end to the discharge end, the residence time for any particular fragment being on the order of 16 to 20 minutes. At the discharge end, the fragmented scrap drops into the other air lock 28, through which it is removed from the system A.

During its residence time within the kiln 2, the fragmented scrap encounters the airstream which enters the kiln 2 at its discharge end and leaves at the feed end. Thus, the airstream flows in the direction opposite to that of scrap and the scrap reaches its highest temperature just as it drops into the air lock 28. Since the temperature of the airstream within the supply duct 30 never exceeds 1125° F., the scrap within the kiln 2 never exceeds that temperature—and that temperature is below the melting temperature for the scrap, yet is above the temperature at which the coating volatilizes. Moreover, the airstream within the duct 30 has a reduced oxygen content, normally on the order of 6% to 8%, and at this rarefied level of oxygen most coatings normally found on aluminum, whether they be lacquer or simply oils, will not ignite, even at the highest temperature of the airstream within the kiln 2. The coating does volatilize and enter the airstream, and any solids which remain simply become entrained in the airstream as particulate matter. Of course, as the airstream flows over the scrap within the kiln 2, it, being hotter than the scrap, loses heat to the scrap and becomes cooler.

The airstream flows through the discharge duct 32 to the cyclone collector 4 where the particulates drop out and are collected. Even so the volatilized components of the coating remain and flow on to the afterburner 8.

Within the afterburner 8, the airstream encounters substantially higher temperatures due to the presence of the flame produced by the burner 42. Moreover, at the entrance to the afterburner 8 the airstream acquires a higher oxygen content due to the introduction of the air from the air line 48. The elevated temperature, together with the additional oxygen, provide an atmosphere suitable for combustion; that is, ignition of the volatilized components of the coating. They are consumed and as a result are converted primarily into carbon dioxide and water. The combustion leaves the airstream again deficient in oxygen—indeed, reduces its oxygen content to the prescribed level of 6% to 8%.

Beyond the afterburner 8, some of the airstream is diverted to the atmosphere through the system exhaust 10, while the remainder passes on to the heat exchanger 12. Passing through the flow path 62 of the heat exchanger 12, the airstream loses heat to the cooling air which flows through the other flow path 64 of the exchanger 12, and as a consequence, the temperature of the airstream drops from about 1600° F. to 1125° F., the latter being the temperature at which it enters the kiln 2.

The entering temperature of 1125° F. is maintained by the first control loop 14. If the temperature of the airstream at the entrance to the kiln 2 becomes too high, the control loop 14 senses this and increases the flow of cooling air through the heat exchange to thereby increase heat extracted from the airstream at the heat exchanger 12. On the other hand, if it drops, the control loop 14 reduces the flow of cooling air to thereby reduce the heat extracted from the airstream. In short, the control loop 14 regulates the cooling air flowing through the flow path 64 of the heat exchanger 12, and thereby controls the temperature of the airstream in the other flow path 62.

Figure 2:
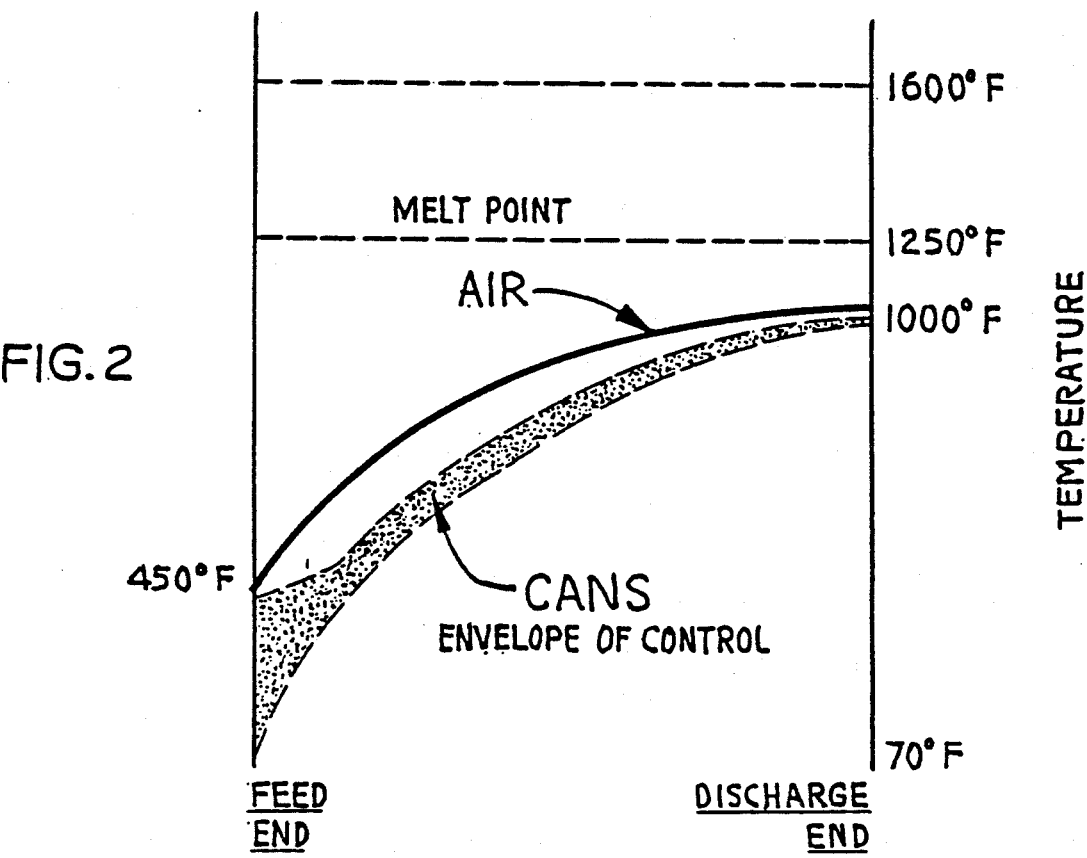
FIG. 2 is a graph showing the temperature of the air and scrap in the kiln of the system.

While the temperature of the airstream entering the kiln 2 remains substantially constant at about 1125° F., the mass flow of the airstream does not. It varies to maintain a generally constant or uniform temperature gradient within the kiln 2 (FIG. 2). Whereas, the temperature of the airstream where it enters the kiln 2 is about 1125° F., the temperature where it leaves is about 450° F. To maintain the gradient, the controller 86 of the second control loop 16, by operating the motor 60 of the system exhaust 10, controls the amount of the airstream diverted to the atmosphere between the afterburner 8 and heat exchanger 12 and thus controls the mass of the airstream passing into the kiln 2 at any given time. If the temperature of the airstream where it leaves the kiln 2 is too low, the mass flow is increased by slightly closing the damper 59 of the system exhaust 10. On the other hand, if the temperature is too great, the damper 59 is opened slightly.

Were it not for the second control loop 16, and its ability to regulate the mass flow of the airstream, within the kiln 2, conditions would vary substantially within the cylindrical chamber 24 of the kiln 2, because it is virtually impossible to maintain any uniformity in the fragmented scrap. First of all, the scrap does not pass uniformly through the kiln 2, that is to say the mass of scrap within the kiln 2 will vary, indeed substantially, from time to time. Of course, the mass of scrap within the kiln 2, to a large measure, determines the amount of heat extracted from the airstream passing through the kiln 2; the greater the mass of the scrap, the more heat extracted. Aside from that, the scrap may contain moisture, particularly if it constitutes expended beverage cans, and water, of course, requires considerable energy to convert to its vapor phase. The amount of moisture may vary considerably, and thus the heat extracted from the airstream also depends on the amount of moisture that is within the scrap in the kiln 2.

Thus, the temperature of the airstream at the discharge end of the kiln 2, where the airstream enters the kiln 2, remains constant, at about 1125° F., and likewise the temperature of the airstream at the feed end of the kiln 2, where the airstream leaves the kiln 2, likewise remains constant at about 450° F., irrespective of the mass of the scrap within the kiln 2 or the amount of moisture in that scrap (FIG. 2). The system A responds to variations in the condition of the scrap by varying the mass flow of the airstream through the kiln 2, that is, the mass flow past any given point in the kiln 2 for a given unit of time. Between the inlet and outlet temperature the airstream experiences a gradual decrease in temperature, that is it possesses a gradient. Along the gradient the scrap never quite reaches the temperature of the airstream, but always remains slightly below it. Indeed, the temperature of the scrap at any point within the kiln 2 varies slightly, that is it lies within an envelope of about 50° F., with the envelope being at a temperature slightly less than the temperature of the airstream at that location in the kiln 2. Even at the discharge end of the kiln 2, where the temperature of the airstream is at its highest, the airstream is not hot enough to melt the scrap. Indeed, the airstream at that location in the kiln 2 is about 100° F. less than the melting temperature of aluminum and the actual temperature of the aluminum at that location is about 100° F., lower.

While the temperature of the airstream exceeds the combustion temperature of the volatile components in most coatings, the coatings do not ignite, because the control loop 18 senses the oxygen content of the airstream entering the kiln 2 and regulates it so that it remains between 6% and 8%, which is below that required to sustain combustion. As a consequence, the volatile components merely volatilize and become part of the airstream, while the solid components drop off as particulates which become entrained in the airstream. The cyclone collector 4 thereafter extracts these solid components from the airstream before the airstream enters the recirculation fan 6 and the afterburner 8.

Figure 3:
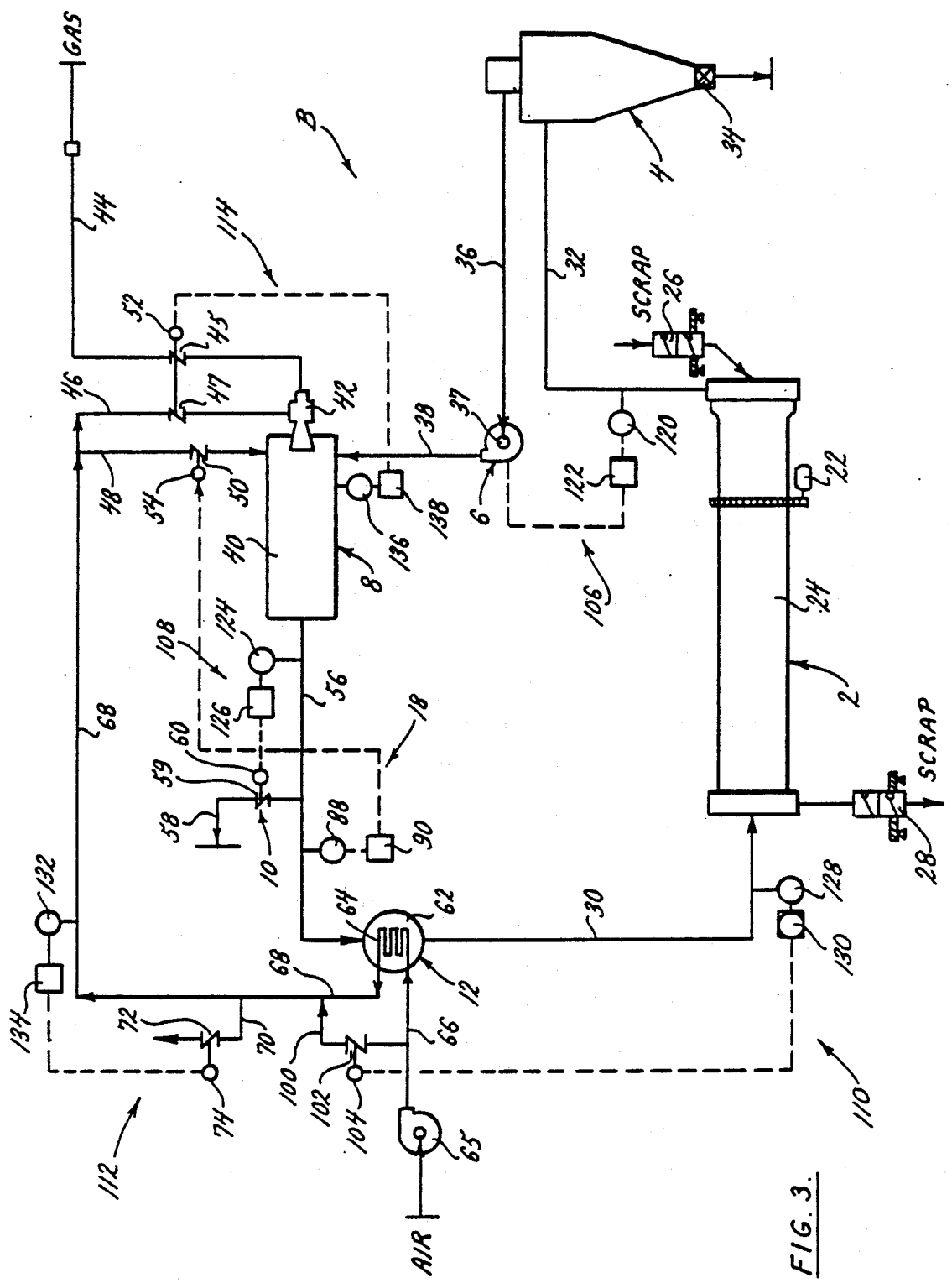
FIG. 3 is a schematic view of a modified system.

A modified system B (FIG. 3) likewise removes coatings from aluminum scrap and in many respects is quite similar to the system A. Indeed, the system B includes the kiln 2, the cyclone collector 4, the fan 6, the afterburner 8, the system exhaust 10 and the heat exchanger 12, as well as the ducts 30, 32, 36 and 56 which connect them. It also has the vent duct 70 and damper 72 and the motor 74 that controls the damper 72. In addition, it has a bypass duct 100 which extends between the supply duct 66 and the discharge duct 68 to thereby bypass the flow path 64 of the heat exchanger 12. The bypass duct 100 contains a damper 102 which is operated by a motor 104.

While the modified system B retains the control loop 18 and its oxygen sensor 88 and controller 90, it does not have the control loops 14 and 16. Instead it has several different control loops 106, 108, 110, 112 and 114.

The control loop 106 includes a temperature sensor 120 which detects the temperature of the air in the duct 32, which is of course, the temperature of the airstream where it discharges from the kiln 2. The sensor 120 is connected to a controller 122 which controls the speed of the motor 37 for the fan 6. When the kiln 2 experiences a greater demand for heat, such as by reason of a greater mass of scrap or increased moisture content, the temperature of the air in the duct 32 drops. The sensor 120 detects this drop in temperature, and the controller 122, reacts to increase the speed of the motor 37. The fan 6 in turn forces more air through the ducts 30, 38 and 56 so that a greater volume of air—and likewise mass of air—flows into the kiln 2 per unit of time, and of course this greater mass has the capacity to deliver more heat to the aluminum scrap. The temperature of the scrap increases and so does the temperature of the airstream leaving the kiln 2 by way of the duct 32. Of course, the reverse also occurs. If the temperature of the airstream in the duct 32 increases, the speed of the fan motor 37 decreases and thereby reduces the mass flow of air.

The control loop 108 operates the system exhaust 10 and as such controls the motor 60 for the damper 59 in the exhaust duct 58. It seeks to maintain constant pressure within the duct 56, as well as within the duct 30 and the cylindrical chamber 24 of the kiln 2, with that pressure being only slightly above atmospheric, for the kiln 2 operates more efficiently at a slightly elevated pressure. To this end, the loop 108 includes a pressure sensor 124 which detects the pressure in the duct 56 at the discharge from the afterburner 8, and a controller 126 which is connected to the sensor 124 and operates the motor 60 of the exhaust damper 59 in response to the pressure detected in the duct 56. If that pressure increases, the controller 126 causes the motor 60 to open the damper 59 and release more air through the system exhaust, 10 so that excessive pressure does not develop within the ducts 30 and 56. Conversely, if the pressure drops, the controller 126 causes the motor 60 to close the damper 59 so that a prescribed minimum pressure exists. The optimum pressure provides good thermal efficiency without fugative emissions past the seals of the kiln 2.

The control loop 110 controls the temperature of the air entering the kiln 2. It includes a temperature sensor 128 which is located in the duct 30 and a controller 130 which is connected to the sensor 128. The controller 130 in turn is connected to and operates the motor 104 for the damper 102 in the bypass duct 100. Should the temperature of the airstream in the duct 30 drop below the prescribed value, which is normally 1125° F., the controller 130 causes the motor 104 to open the damper 102 so that less cooling air from the fan 65 passes through the flow path 64 of the heat exchanges 12. As a consequence, less heat is extracted from the airstream flowing through the other flow path 62, and since the flow path 62 opens into the duct 30, the temperature of the airstream in the duct 30 rises. Conversely, if the temperature in the duct 30 rises, the controller 130 causes the motor 104 to close the damper 102, and this diverts more cooling air through the flow path 64 of the heat exchanger 12 to thereby lower the temperature of the air flowing into the duct 30.

The control loop 112 insures an adequate supply of cooling air for the flow path 64 of the heat exchanger 12. To this end it monitors the temperature of the air that flows through the discharge duct 68 to the afterburner 8. If that air becomes too hot, thus indicating an insufficient flow, it causes the motor 74 to open the damper 72 so that some of the cooling air is discharged to the atmosphere; and this in turn allows a greater volume to flow through the flow path 64 of the heat exchanger 12. In this regard, sometimes the airstream entering the combustion chamber 40 of the afterburner 8 contains so many volatiles that little, if any, heat is required from the burner 42 to consume them and maintain adequate temperatures in the combustion chamber 40. Thus, the burner 42 draws little, if any, combustion air from the discharge duct 68, and this would severely restrict the flow of cooling air through the path 64 of the heat exchanger 12, were it not for the discharge of air through the vent duct 70 and damper 72. The control loop 112 seeks to maintain the temperature of the combustion air that flows through the duct 68 to the burner 42 at about 1100° F. It includes a temperature sensor 132 located in the duct 68 downstream from the vent duct 70 and a controller 134 which responds to the sensor 132 and operates the motor 74 for the damper 72 in the vent duct 70.

The control loop 114 maintains a minimum temperature within the afterburner 8, and that minimum should be high enough to insure that all volatiles derived from the scrap are consumed. It includes a temperature sensor 136 in the combustion chamber 40 of the afterburner 8 and a controller 138 which is connected to and responds to the sensor 136. The controller 138 is connected to the motor 52 which operates the valves 45 and 47 that admit fuel and combustion air to the burner 42 of the afterburner 8. If the temperature within the chamber 40 falls below the prescribed minimum, which should be on the order of 1600° F. for scrap composed primarily of beverage cans, the controller 138 causes the motor 52 to open the valves 45 and 47 still further and thus increase the heat delivered by the burner 42. The temperature within the combustion chamber 40 therefore rises.

In operation, the system B accepts used aluminum beverage cans or other aluminum scrap at its air lock 26 and conveys the scrap through the kiln 2, from which it is discharged at the air lock 28, all as in the system A. Moreover, the system B creates a rarefied atmosphere of 6% to 8% oxygen in the kiln 2, and at the entrance to the kiln 2 maintains the temperature of the airstream at a prescribed temperature below the melting point of aluminum, preferably at 1125° F. The mass flow of air, however, varies to accommodate variances in the mass and constituency of the scrap within the kiln 2. Due to the counterflow construction of the kiln 2, the air possesses its greatest temperature where it enters the kiln 2 at the duct 30, whereas the scrap achieves its greatest temperature where it leaves at the air lock 28. Of course, the heated air volatilizes the coatings, and the volatile components enter the airstream as do particulates.

The cyclone collector 4 separates the particulates from the airstream, but the volatile components pass on to the afterburner 8. Here they are consumed in the combustion chamber 40 where the temperature and oxygen content are high enough to sustain combustion of them.

The combustion within the chamber 40 of the afterburner 8 would substantially increase the pressure within the duct 56 leading from the afterburner 8, were it not for the system exhaust 10. Indeed, the controller 126 and the pressure sensor 124 monitor the pressure within the duct 56 and, by controlling the motor 60 for the exhaust damper 59, open and close the damper 59 to maintain essentially constant pressure in the ducts 30 and 56, and in the cylindrical chamber 40 of the kiln 2 as well. That pressure is slightly above atmospheric, which insures efficiency, but is not so high as to cause the air to escape through seals in the kiln 2.

The temperature of the rarefied air entering the cylindrical chamber 24 of the kiln 2 remains essentially constant at 1125° F. or at any other temperature that is selected. In this regard, the sensor 128 in the duct 30 detects the temperature of the airstream flowing in the duct 30 and is of course monitored by the controller 130. Should the temperature of the airstream drop, the controller 130 causes the motor 104 of the bypass damper 102 to open the damper 102 so that less cooling air flows through the path 64 of the heat exchanger 12. As a consequence, less heat is extracted from the airstream flowing through the other path 62, and that of course is the air which passes into the duct 30. Thus, the temperature of the airstream in the duct 30 increases. The converse likewise holds true; that is, when the temperature of the airstream in the duct 30 increases, the damper 102 closes to direct more cooling air to the heat exchanger 12.

While the control loop 110 seeks to maintain the temperature of the air at the entrance to the kiln 2 constant, the control loop 106 prevents an excessive drop in the air temperature as the air passes through the kiln 2, or in other words maintains a prescribed gradient within the kiln 2 (FIG. 2). As such, it seeks to maintain a generally constant temperature for the air that leaves the kiln 2 through the duct 32. Thus, should the scrap introduced into the kiln 2 place greater demands on the airstream, such as by reason of greater mass or increased moisture, more heat will be extracted from the airstream and the temperature within the discharge duct 32 will drop. The sensor 120 and controller 122 detect this, and the latter causes the motor 37 of the fan 6 to operate at greater speed and thus force more air through the ducts 30, 56 and 30 and ultimately into the kiln 2, yet the temperature of the air at the entrance of the kiln 2, that is in the duct 30, remains the same. The increased mass flow compensates for the greater demands imposed on the kiln 2, and as a consequence, the temperature of the air leaving the kiln 2 through the duct 32 rises. The converse likewise occurs, that is when the temperature in the duct 32 becomes too high, the controller 122 reduces the speed of the fan motor 37 so that the fan 6 forces less air through the kiln 2.

If the demands of the afterburner 8 for combustion air do not meet the cooling needs of the heat exchanger 12, the temperature of the combustion air in the duct 68 will rise. The sensor 132 will detect this and the controller 134 will cause the motor 74 to open the vent damper 72 so that more air passes through the flow path 64 of the heat exchanger 12 to the airstream as it passes through that flow path.

This invention is intended to cover all changes and modifications of the example of the invention herein chosen for purposes of the disclosure which do not constitute departures from the spirit and scope of the invention.

What is claimed is:

1. An apparatus for removing coatings from metal scrap, said apparatus comprising: a kiln having a product feed end at which scrap is introduced into the kiln and a product discharge end where the scrap leaves the kiln; a duct system opening into the kiln; means for generating an airstream which passes through the duct system and the kiln; first control means for sensing the temperature of the airstream at the entrance to the kiln and maintaining that temperature substantially constant and high enough to volatilize components of the coating; and second control means for varying the mass flow of the airstream through the kiln, without altering the oxygen content of the airstream, to maintain the temperature of the airstream as it leaves the kiln substantially constant so as to compensate for variances in the scrap that passes through the kiln.

2. An apparatus according to claim 1 and further comprising third control means for sensing the oxygen content of the airstream that is directed into the kiln and for regulating the oxygen content within the kiln so that airstream within the kiln will not support combustion of the volatile components of the coating.

3. An apparatus according to claim 2 and further comprising a burner directed into the airstream before the airstream enters the kiln for elevating the temperature of the airstream.

4. An apparatus according to claim 3 wherein the burner constitutes part of an afterburner; wherein the airstream after leaving the kiln passes through the afterburner; and further comprising means for introducing air into the airstream beyond the kiln so that within the afterburner, the airstream contains enough oxygen to support combustion of the volatile components of the coating.

5. An apparatus according to claim 4 wherein the means for introducing air introduces that air into the afterburner.

6. An apparatus according to claim 4 and further comprising exhaust means for diverting a portion of the airstream beyond the afterburner so that the diverted portion does not pass into the kiln.

7. An apparatus according to claim 4 and further comprising a heat exchanger through which the airstream passes between the afterburner and the kiln, the heat exchanger extracting heat from the airstream to reduce the temperature of the airstream; and wherein the first control means regulates the amount of heat extracted from the airstream at the heat exchanger.

8. An apparatus according to claim 7 wherein the heat exchanger reduces the temperature of the airstream to essentially the temperature at the entrance to the kiln.

9. An apparatus according to claim 7 and further comprising collector means for extracting particulates from the airstream, the collector means being located downstream from the kiln and upstream from the afterburner.

10. An apparatus for removing, from aluminum scrap, coatings having volatile components, said apparatus comprising: a kiln having a feed end into which scrap is fed and a discharge end where the scrap leaves the kiln, the kiln having means for isolating its interior from the surrounding atmosphere; an afterburner having a combustion chamber and a burner directed into the chamber; a heat exchanger having first and second flow paths which are isolated from each other; a duct system connecting one end of the kiln with the afterburner, connecting the afterburner with one end of the first path in the heat exchanger, and connecting the other end of the first flow path in the heat exchanger with the other end of the kiln; a fan located in the duct system to establish an airstream that flows through the kiln to the afterburner and thence through the first flow path of the heat exchanger and beyond back to the kiln; flow means for directing a cooling fluid through the second flow path of the heat exchanger to extract heat from the airstream as the airstream passes through the fist flow path; a system exhaust located in the duct system for allowing a portion of the airstream to escape; first control means connected to the flow means for regulating the amount of fluid delivered by the flow means to the second flow path so as to maintain the temperature of the airstream at its entrance into the kiln substantially constant; second control means for varying the mass flow of the airstream through the kiln so as to maintain the temperature of the airstream substantially constant where the airstream is discharged from the kiln, even though the nature or mass of the scrap in the kiln varies; and third control means for maintaining the oxygen content of the airstream within the kiln below that which will support combustion of the volatile components.

11. An apparatus according to claim 10 and further comprising means for introducing air into the afterburner to provide enough oxygen to effect combustion Of the volatile components of the coating within the afterburner; and wherein the third control means regulates the amount of air introduced into the afterburner by the means for introducing air.

12. An apparatus according to claim 11 wherein the means for introducing air into the afterburner derives that air from the second flow path of the heat exchanger, whereby the air is heated and is at an elevated temperature when it enters the afterburner.

13. An apparatus according to claim 12 wherein the burner of the afterburner derives heated air from the second flow path of the heat exchanger.

14. An apparatus according to claim 10 wherein the first control means maintains the constant temperature of the airstream at the entrance to the kiln below the melting temperature of aluminum.

15. An apparatus according to claim 10 wherein the system exhaust includes a damper which controls the proportion of the airstream that escapes; and the second control means regulates the damper in the system exhaust.

16. An apparatus according to claim 10 wherein the second control means varies the speed of the fan.

17. An apparatus according to claim 16 wherein the fan is located in the duct system between the kiln and the afterburner.

18. An apparatus for removing volatile coatings from metal, said apparatus comprising: fan means for generating an airstream; a kiln through which the airstream and the metal passes, the kiln having a product feed end at which metal is introduced into the kiln and a product discharge end at which metal leaves the kiln; heating means for adding heat to the airstream to elevate the temperature of the airstream; heat exchange means through which the airstream passes between the heating means and the kiln for extracting heat from the airstream to reduce the temperature of the airstream before it enters the kiln; first control means for sensing the temperature the airstream possesses as it enters the kiln and for controlling the amount of heat removed at the heat exchange means to maintain the temperature of the airstream entering the kiln substantially constant at a magnitude high enough to volatilize components of the coating; and second control means for varying the mass flow of the airstream through the kiln to compensate for variances in the metal that passes through the kiln.

19. The apparatus according to claim 18 wherein the airstream enters the kiln at its product discharge end and leaves the kiln at its product feed end, so that the airstream flows through the kiln in the direction opposite to that in which the metal passes through the kiln.

20. The apparatus according to claim 18 wherein the first control means regulates the heat exchange means such that the temperature of the airstream entering the kiln is above the temperature at which the coating volatilizes and is below the melting point of the metal.

21. The apparatus according to claim 18 wherein the second control means senses the temperature that the airstream possesses as it leaves the kiln and varies the mass flow such that the mass flow increases to offset a decrease in the temperature and decreases to offset an increase, all to maintain that temperature generally constant, whereby the second regulating means varies the mass flow to compensate for variances in the mass and nature of the metal that passes through the kiln.

22. An apparatus according to 13 and further comprising fourth control means for sensing the temperature of the air directed to the afterburner from the second flow path of the heat exchanger and for increasing the flow of air through the second flow path of the afterburner, heat exchanger beyond that required to effect combustion of volatile components and to operate the burner, should the temperature of the air directed to the afterburner becomes excessive.

23. An apparatus according to claim 22 wherein the fourth control means includes means for exhausting some of the air that has passed through the second flow path of the heat exchanger to the atmosphere.

24. An apparatus according to claim 18 wherein the second control means senses the temperature of the airstream as it leaves the kiln and varies the mass flow of the airstream through the kiln to maintain the temperature of the airstream as it leaves the kiln substantially constant.

* * * * *